(No Model.)
A. M. NASH.
PLOW.
No. 380,919.  Patented Apr. 10, 1888.
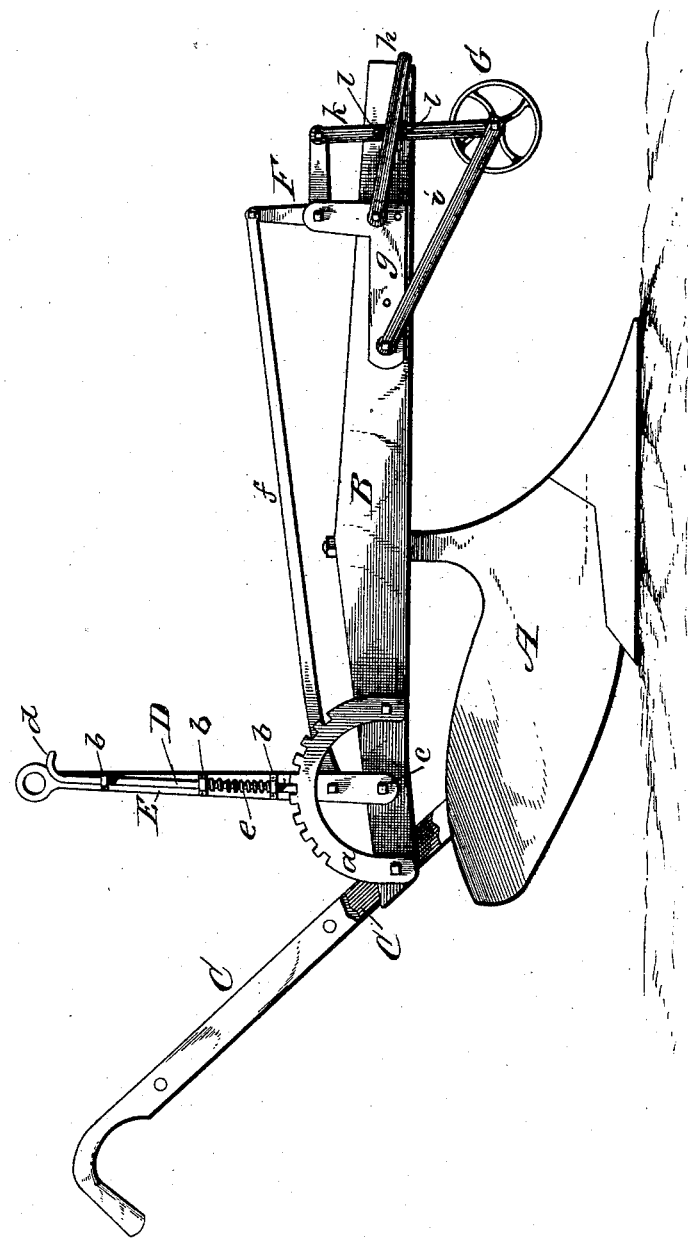

UNITED STATES PATENT OFFICE.

ALBERT M. NASH, OF OWEGO, NEW YORK.

PLOW.

SPECIFICATION forming part of Letters Patent No. 380,919, dated April 10, 1888.

Application filed December 28, 1887. Serial No. 259,240. (No model.)

*To all whom it may concern:*

Be it known that I, ALBERT M. NASH, a citizen of the United States, residing at Owego, in the county of Tioga and State of New York, have invented certain new and useful Improvements in Plows; and I do hereby declare that the following is a full, clear, and exact description of the same, reference being had to the annexed drawing, making a part of this specification, and to the letters and figures of reference marked thereon.

The present invention has relation to that class of plows which are provided with attachments whereby the wheel and draft-clevis can be conveniently lowered or raised without stopping the plow; and the invention consists in providing means for attaining this end, whereby the wheel and clevis are conveniently adjusted as to height and held securely in their adjusted positions by a simple and practically-operating device or attachment to the plow, as will be hereinafter described, and subsequently pointed out in the claim.

In the accompanying drawing, which represents a side view of a plow with my attachment applied thereto, A designates the plow, B the beam provided at its rear end with the usual handles, C, all of which are of the ordinary construction.

To the rear end of the plow-beam B is suitably fastened a segmental notched bar, $a$, with which engages a spring-latch consisting of a rod, D, held to a hand-lever, E, by means of lugs $b$, which are perforated or have holes through which extends the rod. The lever E is pivoted at $c$ to the beam B, and the rod D is bent at its upper end to form a hook, $d$, for convenience of operating it, a spiral spring, $e$, being coiled around the rod D, and is located between the two lower ones of the flanges or lugs $b$.

To the lever E is connected one end of a rod, $f$, and the forward end in like manner is connected to a bell-crank lever, F, pivoted to the upright portion of a bracket, $g$, secured to the plow-beam. To the bell-crank lever F is suitably connected the usual clevis, $h$, and to the bracket $g$ and bell-crank lever are connected, respectively, the arms $i\,k$, to the lower ends of which is journaled the wheel G. The arms $k$—one on each side of the plow-beam—are provided with lugs $l$, so that when the arms are raised the clevis will be carried with them. When it is desired to raise the wheel G, the latch is raised to disengage it from the notched plate $a$, and by bringing the lever E in a direction toward the handles of the plow the wheel will be elevated through the intermediate connections, consisting of the rod $f$ and bell-crank lever, also the arms $i\,k$. As will be seen, both the wheel and draft-clevis will be raised to change the depth of the furrow without the necessity of stopping the plow.

The above means, especially the bell-crank lever and the arm with its lugs, are considered of material importance in rendering the attachment effective and easily operated, and it should be understood that bracket $g$ and arms $i$ and $k$ are duplicated alike on each side of the plow-beam.

Having now fully described my invention, what I claim as new, and desire to secure by Letters Patent, is—

The combination, with the plow-beam and the bracket $g$, secured thereto, near the forward end thereof, of the bell-crank lever F, pivoted to said bracket, the arm $i$, secured at one end to said bracket, the arm $k$, pivoted at one end to one arm of said bell-crank, the wheel G, journaled in the lower ends of said arms $i$ and $k$, the connecting-rod $f$, pivoted to the other arm of said bell-crank, and the operating-lever E, pivoted to the beam and connected with said rod, substantially as shown and described.

In testimony that I claim the above I have hereunto subscribed my name in the presence of two witnesses.

ALBERT M. NASH.

Witnesses:
SARAH M. CURTIS,
P. C. OAKLEY.